United States Patent [19]

Murphy et al.

[11] 4,052,613

[45] Oct. 4, 1977

[54] LOG-INJECT-LOG IN SAND CONSOLIDATION

[75] Inventors: Robert P. Murphy; James W. Spurlock, both of Tulsa, Okla.

[73] Assignee: Standard Oil Company (Indiana), Chicago, Ill.

[21] Appl. No.: 675,045

[22] Filed: Apr. 8, 1976

[51] Int. Cl.$^2$ .............................................. G01V 5/00
[52] U.S. Cl. .................................................... 250/259
[58] Field of Search ............................... 250/259, 260

[56] References Cited

U.S. PATENT DOCUMENTS

| | | | |
|---|---|---|---|
| 3,503,447 | 3/1970 | Hamby, Jr. | 250/260 X |
| 3,586,858 | 6/1971 | Youmans | 250/259 |
| 3,628,011 | 12/1971 | Wyman | 250/259 |

Primary Examiner—Davis L. Willis
Attorney, Agent, or Firm—R. A. Stoltz

[57] ABSTRACT

A method is described for gathering information for the determination of the adequacy of placement of sand consolidating plastic for sand control in oil and gas wells. The method uses a high neutron cross-section tracer which becomes part of the plastic and uses pulsed neutron logging before and after injection of the plastic. Preferably, the method uses lithium, boron, indium, and/or cadmium tracers. Boron oxide is especially useful and can be dissolved in alcohol and mixed with the plastic ingredients.

6 Claims, No Drawings

LOG-INJECT-LOG IN SAND CONSOLIDATION

BACKGROUND OF THE INVENTION

This invention relates to sand control in oil and/or gas wells by means of sand consolidating plastic and more particularly to the detection of the placement of the plastic.

Oil and gas are produced from underground formations through wellbores drilled down from the surface to penetrate the formation. Some hydrocarbons are contained in the pores of consolidated rocks. When these hydrocarbons (oil, gas, or both) are produced through the wellbore, they are generally free of sand. However, many wells produce fluid from hydrocarbon-bearing formations which are incompetent or unconsolidated; that is, the sand particles are not strongly attached to each other, and, when the fluid (possibly also with substantial amounts of water) is produced, it tends to carry entrained sand with it. This sand can cause extremely serious damage to well equipment. In producing from such unconsolidated formations, some method should be provided to restrain the sand flow into the well.

Generally a sand control operation is performed by packing off the zone of interest and injecting plastic into the formations surrounding the well and setting the plastic. This can be done either by injecting plastic-coated sand particles, which are consolidated when the plastic is set (the injection of coated particles is described in U.S. Pat. Nos. 3,123,137, issued to Young, et al., on Mar. 3, 1964; see also U.S. Pat. Nos. 2,815,815, issued to Hower, et al. on Dec. 10, 1957), or by injecting a plastic which is then set to consolidate the formation sand.

With either method, however, there has been no practical way to control the flow to inject enough plastic in all of the wellbore openings to consistently prevent sand production. The plastic is relatively expensive and thus it is not economically feasible to inject extremely large quantities of the plastic. In addition, some degree of porosity must be maintained to allow production of oil and/or gas and a large quantity injection of plastic generally would result in blocking of the flow. The injected plastic predominantly flows into those areas where there is little resistance to flow. In other areas (such as those with some blockage by a drilling mud or such as an area with much lower permeability, for example) little or no plastic is injected. Such inadequate placement of the plastic will result in high sand flow when the well is put on production. In such cases, the well must generally be shut in, the sand cleaned out of the wellbore, piping, and equipment, and additional sand consolidation performed. This is extremely time-consuming and expensive.

Various types of plastics have been used for sand consolidation. Phenol-formaldehyde, epoxy resins, and furfuryl alcohol resins have all been used in sand consolidation, as described in, for example, U.S. Pat. Nos. 2,378,817, issued to Wrightsman, et al., on June 19, 1945; U.S. Pat. No. 2,476,015, issued to Wrightsman on July 12, 1949; U.S. Pat. No. 3,100,527, issued to Hilton, et al., on Aug. 13, 1963; U.S. Pat. No. 3,176,768, issued to Brandt, et al., on Apr. 6, 1965; U.S. Pat. No. 3,199,590, issued to Young on Aug. 10, 1965; and U.S. Pat. No. 3,209,826, issued to Young on Oct. 5, 1965. Consolidation with polyurethane is described in U.S. Pat. No. 3,189,091, issued to Bearden and Spurlock on June 15, 1965.

Pulsed neutron logs with tracers in the injected liquids have been used in cased wells for various purposes (but apparently not for the evaluation of sand consolidation). U.S. Pat. No. 3,631,245, issued to Jorden on Dec. 28, 1971; U.S. Pat. No. 3,825,752, issued to Murphy and Froning on July 23, 1974; and U.S. Pat. No. 3,852,593, issued to Robinson on Dec. 3, 1974, illustrate the technique of determining the residual oil saturation by pulsed neutron measurements. U.S. Pat. No. 3,480,079, issued to Guinn, et al., on Nov. 25, 1969, illustrates the use of a different logging technique with analysis to plan the next step in connection with hydraulic fracturing.

SUMMARY OF THE INVENTION

This invention concerns a method to detect an effective placement of a sand consolidating plastic in a producing formation penetrated by a well. Two logs sensitive to the presence of a tracer in the plastic are run, one before and the other after treating the formation. Generally, at least a certain amount of consolidating plastic is to be injected into each zone of the unconsolidated sand (i.e., through each penetration of a cased well). Wherever a comparison of the logs shows a zone which was to be consolidated having an insufficient increase in neutron capture indicating insufficient plastic, remedial action such as isolating the zone having insufficient plastic and squeezing additional plastic is performed before resuming production. The injection of the required additional plastic before production is begun avoids the well sanding up and results in great savings in time and expense. The method includes the steps of logging an earth formation with a pulsed neutron log, injecting a plastic material together with a tracer having a thermal neutron absorption (or capture) cross section substantially higher than that of the earth formation, at least partially setting the plastic to form a solid with the tracer therein, and repeating the pulsed neutron log such that the logs can be compared to determine if additional plastic injection is required. Preferably, the method uses lithium, boron, indium, and/or cadmium tracers, especially in the form of lithium chloride, boron oxide, or cadmium chloride.

DESCRIPTION OF THE PREFERRED EMBODIMENT

Techniques for well logging, including neutron pulse logging, are, of course, well-known. A number of well logging techniques have been used in cased wells for various purposes (but apparently not for evaluation of sand consolidation). These techniques include density logs, gamma logs, and neutron logs (a hydrogen-sensitive log, not to be confused with the pulsed neutron log). These techniques are generally inappropriate for evaluation of placement of sand consolidating plastics, as these logs are generally relatively insensitive to the injection of plastic, and it is difficult to insert appropriate tracers. It has been determined, however, that with an appropriate high thermal neutron cross-section tracer, a pulsed neutron log (sometimes called a thermal neutron decay time log or Neutron Lifetime Log) is quite sensitive to the injection of the consolidating plastic.

As used with this invention, the tracer is a part of the solid which results from the setting of the plastic, rather than remaining as a liquid as in the aforementioned pulsed neutron well logging patents. This results in the advantages of being assured that the tracer and the plastic will remain generally in the same location and one can repeat the log of the well at any later date (if the well begins to produce significant quantities of sand, for example). It should be noted that the use of the liquid prior art tracers (i.e., aqueous solutions of sodium chloride or boric acid) would not assure either that the tracer is injected or would remain in the same location as the plastic.

Tracers can be inserted various ways (such as in the form of suspended solids) but tracers which can be dissolved in the solvents mixable with the plastic ingredients are more convenient, are a more positive indication of plastic location and are therefore preferred.

In addition, while a tracer having a thermal neutron absorption cross section which does not significantly exceed that of chlorine can be used, as logging before and after plastic injection allows the analysis of relatively small changes, the use of such relatively low crosssection tracers can result in a loss of accuracy. The concentration of chlorine in the chlorine-containing brine in the vicinity of the wellbore is often as high or slightly higher than the usable concentration of tracer in the plastic. Injecting the plastic can displace brine. Thus it is desirable that the tracer have a cross section greater than chloridecontaining brine. Further, while a number of elements have a quite high capture cross section, the use of many of them is limited either by ecological reasons (i.e., mercury) or by economic reasons (i.e., gold and several of the rare earth elements, including the especially high capture cross-section gadolinium). Thus, lithium, boron, indium, or cadmium are preferred.

As noted previously, forms of the tracers which are soluble in an organic solvent compatible with the plastic ingredients are preferred. Absolute alcohol in a limited quantity is generally compatible with sand consolidating plastics and, in particular, has been found to be compatible with polyurethane, which can be used in sand consolidation as described in the aforementioned U.S. Pat. No. 3,189,091, issued to Bearden and Spurlock.

Polyurethane plastic with a tracer for use in the manner of this invention can be prepared as follows: 500 gallons of resin (commercially available from DuPont as Adiprene) is mixed with 500 gallons of methyl ethyl ketone. Ten lbs of boron oxide is dissolved in 29 gallons of absolute ethyl alcohol. These two solutions are then mixed together to provide fluid for consolidation in a well. This quantity of plastic will, when used for ten feet of perforated interval for example, provide a radial penetration of between three and four feet.

If lithium chloride is to be used, about 210 lbs of it in 100 gallons of alcohol can be substituted for the boron oxide-alcohol solution in the above procedure. When such large amounts of alcohol are used, the quantity of connate water will generally not completely set the plastic and a water post-flush is required.

In practicing the invention, the first pulsed neutron log is run through the intervals of interest in the earth formation. A polyurethane-tracer solution, such as described above, is then injected in the manner known in the sand consolidating art. It is then allowed to at least partially set. In some cases, this requires the injection of a second fluid with, perhaps, an appropriate catalyst therein. Polyurethane, begins to set up as soon as it contacts the connate water in the formation and thus setting the plastic is achieved by allowing it to remain in place in the formation for an appropriate length of time (typically for 24 hours). Preflushes and postflushes, appropriate to provide good adhesion and good porosity for the particular plastic employed should, of course, be used. Again, a water post-flush is desirable with polyurethane to assure complete setting. After the plastic is generally solidified, a second pulsed neutron log is run. The increase in neutron capture of the second log over the first log provides information on the placement of the plastic, and additional sand consolidating plastic can be injected as required. Generally, if additional consolidations are performed, an additional log will be made after each consolidation to evaluate the placement of the plastic.

Tools have been proposed which will perform multiple functions, including consolidating and logging without pulling the tool. U.S. Pat. No. 3,174,547, issued to Fields on Mar. 23, 1965, and U.S. Pat. No. 3,417,827, issued to Smith, et al., on Dec. 24, 1968, are for other types of logging, but illustrate what could be done. The plastic thus could be inserted with the same multipurpose tool used to perform the pulsed neutron logs. The polyurethane requires only a single injected fluid and can be mixed and kept for long periods of time as it does not start to set up until it contacts the connate water in the formation (as opposed to those sand consolidating plastics which have a quite limited pot life after mixing and must, therefore, be injected rather soon after mixing). Thus polyurethane is convenient for use in a multipurpose tool, and some of the plastic can be retained in the tool for use many hours later if analysis of the logs indicates that an additional injection is required. It will be noted that the logging can be performed before the plastic is entirely set, and thus the post-injection logging could be performed when the plastic is only partially set. The plastic should be at least partially set (generally solidified), however, to assure that the plastic does not move significantly from the location it occupies during post-injection logging.

As cadmium chloride is also soluble in alcohol, about the same weight of cadmium chloride could be substituted for the boron oxide in the above procedure. As boron oxide and cadmium chloride have substantially higher thermal neutron cross sections than lithium chloride, they can be used in lesser amounts.

Lithium chloride and the plastic have macroscopic neutron capture cross sections of about $3100 \times 10^{-3}$ $cm^2/cm^3$ and $21.5 \times 10^{-3} cm^2/cm^3$, respectively. Generally, it is desirable to provide a change in pulsed neutron log response of at least about $1.5 \times 10^{-3} cm^2/cm^3$ (1.5 capture units) from the background cross section. Typically, background thermal neutron cross sections are about 14–18 capture units. If the pore volume is 32% of the total volume and 10% of the pore volume is to be filled with plastic, then the lithium chloride concentration in the hardened plastic should be a minimum of about 2.8% by volume. As the cross section of $B_2O_3$ is about 32,000 capture units, and the cross section of $CdCl_2$ is about 33,000 capture units, the minimum amounts are correspondingly above 0.26% and 0.25% by volume, respectively. In polyurethane, the minimum quantities as weight percents of the resin would be about 5.3 weight percent for lithium chloride, 1.0 weight percent for cadmium chloride, and about 0.6 weight percent for boron oxide.

In wells in which the plastic principally displaces brine and in which the brine has very high (200,000 ppm) NaCl levels, higher amounts (at least 1.5X the above minimum) of the tracer should be used.

For good definition, it is preferable to limit the maximum amount of tracer material used to keep the particular logging instrument in range. The maximum change in pulsed neutron response for a typical instrument with a range up to about 40 capture units would be thus be about 22–26 capture units. This would correspond to 4.3 and 4.2 volume percent concentrations of boron oxide and cadmium chloride in the plastic. Lithium chloride concentrations of about 40% by volume would be required to provide this maximum change and such concentrations would, of course, adversely affect any plastic. Thus, the maximum lithium chloride concentration is limited by the particular plastic used.

From the thermal neutron cross section of the tracer and of the background and knowing the instrument sensitivity, one can calculate how much of the particular tracer is required to provide an effective amount for each application. It can be seen, for example, that less than one-fifth as much boron oxide would be required if all of the boron were supplied as the boron-ten isotope.

This invention can, of course, be used with plastics such as phenol-formaldehyde, epoxy resins, and furfuryl alcohol resins, in addition to polyurethane. Tracers can be added to any such plastic in the form of suspended solids, but preferably are added dissolved in an appropriate solvent.

It is convenient to insert the tracer containing plastic in the form of a generally dry coating on particles of sand. The injection of coated particles such as described in the aforementioned Young, et al., patent provides good control not only of adhesion of the plastic to the sand, but also of the porosity of the consolidated formation. When the plastic is inserted in a form of a coating on grains of sand, the plastic can be generally dry but not set. Such applications can for example use thermosetting plastics in which the solvent is evaporated at below the setting temperature and the injection slurry kept below the setting temperature until the slurry is in place. It is also possible to use systems which are set by catalysts and inject a solution containing the catalyst after the coated sand has been injected into the formation.

The invention is not to be construed as limited to the particular forms described herein, since they are to be regarded as illustrative rather than restictive. The invention is intended to cover all configurations which do not depart from the spirit and scope of the invention.

We claim:

1. A method for detecting the effect of a sand consolidation operation in a hydrocarbon formation penetrated by a well such that additional plastic injections can be used if required, said method comprising:
    a. logging an earth formation with a pulsed neutron log;
    b. injecting a plastic material together with a tracer having a thermal neutron cross section substantially higher than that of the earth formation;
    c. at least partially setting the plastic with the tracer therein; and
    d. repeating the pulsed neutron log, whereby the logs can be compared to determine if additional plastic injection is required.

2. The method of claim 1 wherein said tracer comprises at least one element selected from the group consisting of lithium, boron, indium, and cadmium.

3. The method of claim 2 wherein said tracer is added to said injected plastic as a chemical compound soluble in an organic solvent compatible with said plastic.

4. The method of claim 3, wherein said tracer added to said plastic principally comprises at least one compound selected from the group consisting of lithium chloride, boron oxide and cadmium chloride.

5. The method of claim 4, wherein said tracer material principally comprises boron oxide.

6. The method of claim 2, wherein said plastic material is injected in the form of a coating on sand particles.

* * * * *